UNITED STATES PATENT OFFICE.

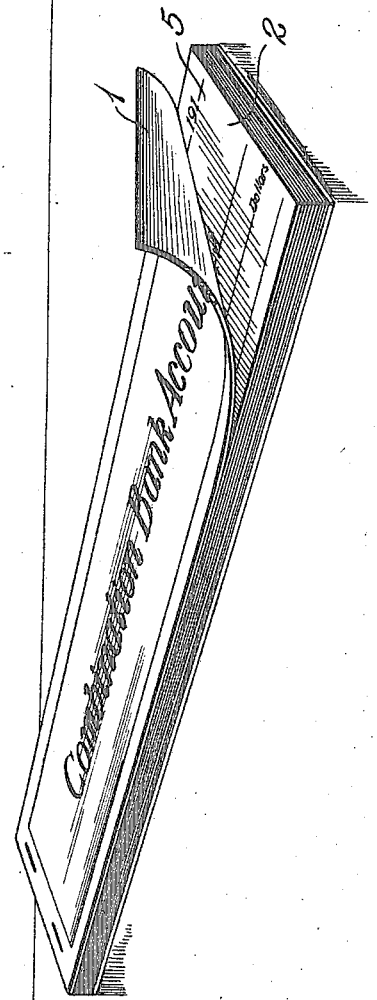

PAUL KUEHN, OF DETROIT, MICHIGAN.

COMBINED CHECK AND DEPOSIT-SLIP.

1,208,579. Specification of Letters Patent. Patented Dec. 12, 1916.

Application filed June 30, 1913. Serial No. 776,475.

*To all whom it may concern:*

Be it known that I, PAUL KUEHN, a citizen of the United States of America, residing at Detroit, in the county of Wayne and State of Michigan, have invented certain new and useful Improvements in a Combined Check and Deposit-Slip, of which the following is a specification, reference being had therein to the accompanying drawings.

This invention relates to a combined check and deposit slip especially adapted for use in banking and commercial transactions.

It is a great convenience for individuals to have a commercial bank account so that they may pay bills by check instead of being obliged to carry cash about with them, but a great amount of work is involved in keeping a very large number of small accounts in a bank and bankers are therefore loath to open commercial accounts with the public at large. Saving accounts on the other hand are, however opened though the amount deposited be very small, owing to the fact that it cannot be checked out and usually remains in the bank for a considerable length of time without the necessity for making a large number of entries against it of moneys withdrawn.

The object of this invention is the production of a medium whereby a bank is recompensed for its trouble and expense in handling small commercial accounts and small depositors are thereby permitted to have the benefit of a commercial account upon which they may draw by check and are at the same time required to place small amounts in savings accounts, thus encouraging the starting and maintaining of savings accounts and the spirit of thrift and economy among the people.

To these ends the invention consists in providing a combined check and deposit slip printed in the form of a blank check with a stub or order form to be signed by the maker when he fills out the check, authorizing the bank upon which the check is drawn to take a specified amount from his commercial account and place it to the credit of his savings account.

The invention further consists in certain other new and useful features in the construction and arrangement, all as hereinafter described, reference being had to the accompanying drawing in which—

Figure 1 is a perspective view of a book of slips embodying the invention; and Fig. 2 an elevation of one of the leaves or slips.

The book is provided with a cover 1 of any suitable material and construction within which the leaves or slips 2 are bound. This is a preferable construction but it will be understood that the leaves may be in the form of separate slips or blanks unbound, and if found desirable several of these slips may be printed upon one sheet and divided by a suitably perforated tearing line, as is the common practice in printing blank checks.

Each sheet or page is divided intermediate its ends by a transverse tearing line 3 which separates the portion to be detached and given out as a check from the stub portion 4 which is printed with the usual blank spaces for recording the number of the check, the amount, the date, in favor of whom drawn, and for what purpose. Also columns for entering the amounts withdrawn and deposited and spaces for totals and amounts to be carried forward, all printed and arranged in an old and well known manner. The outer end portion of the sheet is printed with the usual form of blank check 5 giving the name of the bank upon which the check is drawn, the date and number of the check, spaces for the name of the payee, the amount of the check and the signature of the drawer, all arranged in an old and well known manner.

Between the blank form of check 5 and the stub 4 is a space which is divided from the blank check 5 by a tearing line 6 and forms a detachable stub or coupon 7 upon which is printed the name of the bank upon which the check is drawn and the direction or order to the bank specifying as follows: "Deposit to my credit in the savings department one dollar, charge the same to my commercial account. Signed ———". This direction to the bank may be varied as desired, making the amount to be withdrawn from the depositor's commercial account and placed to his credit in his savings account more or less as desired. When the drawer of the check fills out the blank 5 and signs it he will also sign the stub 7 which will be detached from the stub and left integral with the check. In due course the check with the stub 7 attached will reach the bank upon which the check is drawn and this bank, proceeding in accordance with the direction of the drawer of the check will charge his commercial account with the amount specified upon the stub 7 and credit the same to him in his savings account. In this manner every time a depositor draws a check he will at the same time place a specified amount in his savings account, thus increasing that account which is left for a long period in the hands of the banker and will therefore be earning him interest which will recompense him for his trouble in handling the commercial account of the depositor. On the other hand the depositor under this arrangement will be obliged to deposit a stipulated sum in his savings account every time he draws a check upon his commercial account, and thus small depositors will be induced to open savings accounts and to maintain them and the spirit of saving, thrift and economy will be encouraged.

Obviously changes may be made in the printed matter upon the slip and the arrangement of parts may be varied without departing from the spirit of my invention, and I therefore do not limit myself to the particular form shown.

Having thus fully described my invention what I claim is:—

The combination with an ordinary stub, and an ordinary check, of an intermediate deposit portion between said stub and said check and divided therefrom by tearing lines whereby said check and said deposit portion may be detached from said stub and said intermediate deposit portion detached from said check, said intermediate deposit portion being non-negotiable when detached from said check and having thereon indicia directing the bank upon which the check is drawn to deposit to the credit of the drawer of the check in a savings department, a specified amount and to charge the same to the commercial account of the drawer of the check, together with indicated space contiguous to the check for the signature of the drawer.

In testimony whereof I affix my signature in presence of two witnesses.

PAUL KUEHN.

Witnesses:
 LEWIS E. FLANDERS,
 G. E. McGRANN.